United States Patent [19]

Haefner et al.

[11] Patent Number: 4,675,502
[45] Date of Patent: Jun. 23, 1987

[54] REAL TIME TRACKING CONTROL FOR TAUGHT PATH ROBOTS

[75] Inventors: Kenneth B. Haefner; Larry M. Sweet; Ming H. Kuo, all of Schenectady, N.Y.

[73] Assignee: General Electric Company, Schenectady, N.Y.

[21] Appl. No.: 812,216

[22] Filed: Dec. 23, 1985

[51] Int. Cl.⁴ ............................................. B23K 9/12
[52] U.S. Cl. .............................. 219/124.34; 318/574; 901/3; 901/42; 901/47
[58] Field of Search ................... 219/124.34; 901/3, 9, 901/42, 47; 318/569, 571, 574, 576, 577

[56] References Cited

U.S. PATENT DOCUMENTS

| | | | |
|---|---|---|---|
| 4,356,378 | 10/1982 | Cloos et al. | 219/124.1 |
| 4,380,696 | 4/1983 | Masaki | 219/124.34 |
| 4,542,279 | 9/1985 | Case, Jr. et al. | 219/124.34 |
| 4,568,816 | 2/1986 | Casler, Jr. | 219/124.34 |

OTHER PUBLICATIONS

L. M. Sweet, "Sensor-Based Control Systems for Arc Welding Robots", TIS Report No. 84CRD024, Feb. 1984, Corporate Research and Development, General Electric Co.
R. S. Baheti, et al, "Operational Performance of Vision-Based Arc Welding Robot Control System", Sensors and Controls for Automated Manufacturing and Robotics, ed. by K. A. Stelson and L. M. Sweet, WAM ASME, Dec. 9-14, 1984, pp. 93-105.

Primary Examiner—Clifford C. Shaw
Attorney, Agent, or Firm—Donald R. Campbell; James C. Davis, Jr.; Paul R. Webb, II

[57] ABSTRACT

A real time steering capability is provided to permit robot motion to be modified continuously in three dimensions as the robot is moving along a taught path. An arc welding robot or other taught path robot has a sensor located on the robot arm to sense the position of a desired path. The tracking control provides real time steering commands to the standard robot taught path and are calculated based on maintaining a constant, preprogrammed velocity along the desired path and coordination with the taught path. Offsets to the robot taught path are computed in a manner that allows the robot to smoothly follow the actual path as measured by the look ahead path sensor. The offsets are determined as separate x, y, z and twist integrations for the end effector and represent the total deviations from the robot taught path.

20 Claims, 11 Drawing Figures

ROBOT MOTION

REAL TIME STEERING VELOCITY DIAGRAM

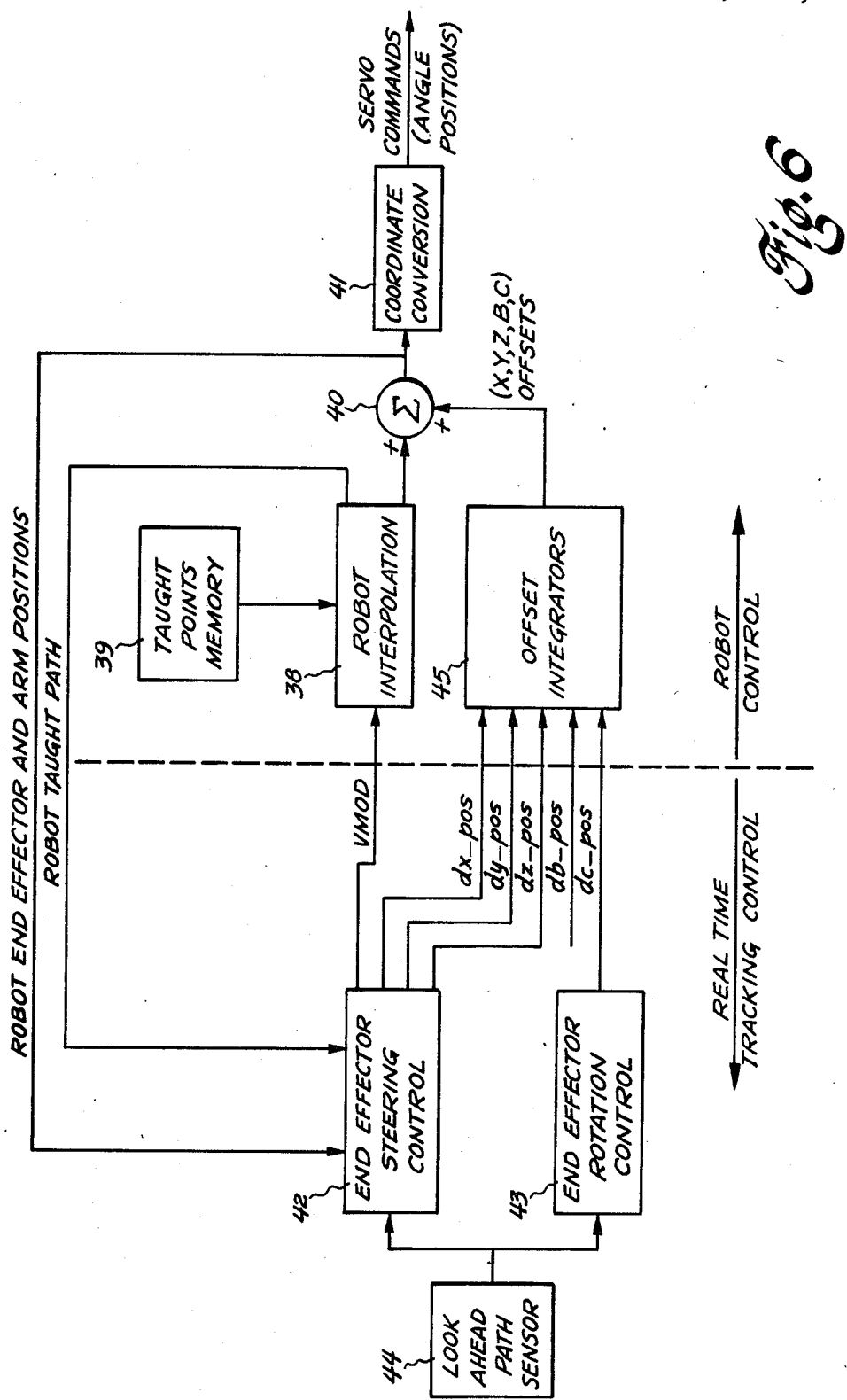

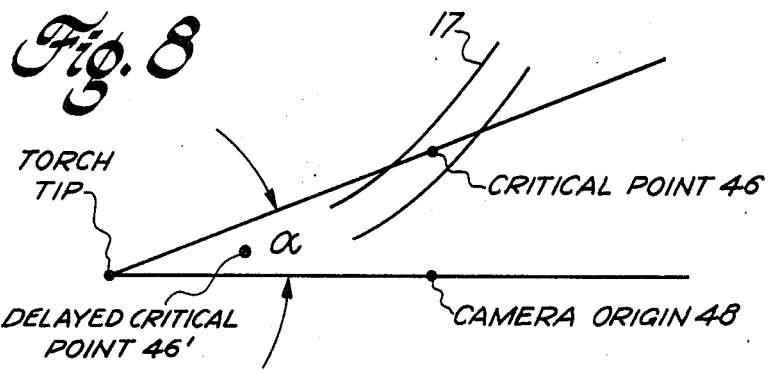
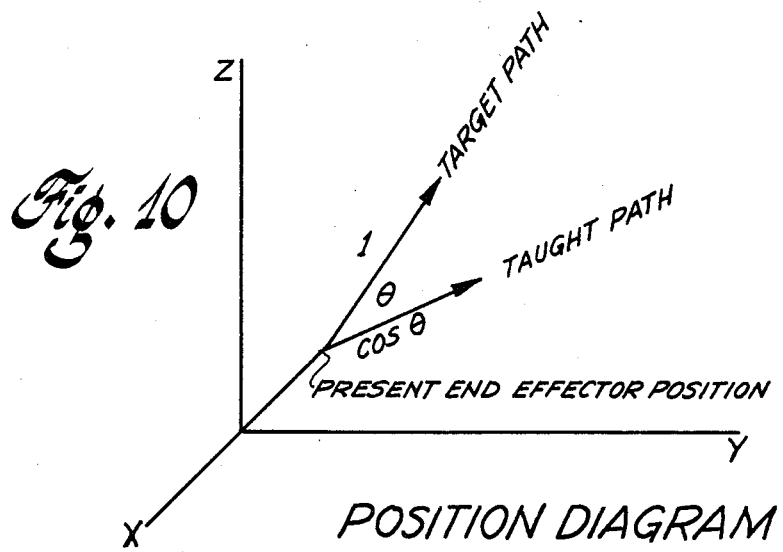
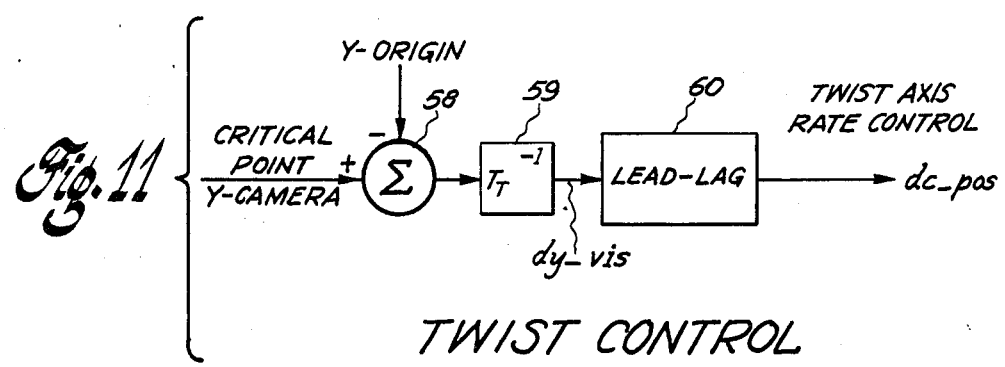

REAL TIME TRACKING CONTROL FOR TAUGHT PATH ROBOTS

BACKGROUND OF THE INVENTION

This invention relates to controlling a robot in real time to track along a path, and more particularly to a method of modifying the taught motion of a robot using path sensor information and to an improved robot having such a tracking control.

Nearly all commercial industrial robots employ the taught path method for programming desired motions. The robot operator moves the robot end effector to its desired location using a special purpose terminal known as a teach pendant. Once in position, the robot control computer is instructed to store the coordinates of the point. The desired path is programmed as a sequence of such stored points. Using the teach pendant, the operator may also specify the velocity along the path, as well as welding conditions or other parameters. Similarly, the programmed path may be downloaded from an external computer performing off-line robot motion planning. During normal operation or playback, the robot controller performs the necessary interpolation routines required to command the robot mechanicals to move in linear, circular or articulated motion.

The taught path can be varied while the robot is in the teach mode, but is limited to a single path in the playback or automatic mode. In many applications, it is desirable to modify the taught motion of the robot, to compensate for misplacement of the workpiece, account for dimensional tolerances, or account for movement of the workpiece due to thermal distortion. Present robot controls allow limited modification to the taught path motion which are restricted to fixed offsets for selected points. The offsets are limited to set delta x, y, z changes prior to playback of a given path program.

For those applications where path changes are wanted between workpiece setups or may vary during execution of the motion, the pre-taught program is not adequate and it becomes necessary to provide a means of deviating from the pre-taught path based on inputs from a real time path sensor. The deviation from the taught path has to be accomplished in coordination with the taught path of the robot. The motion of the conventional robot is accomplished as a series of incremental absolute position moves along a taught path at time intervals of 10 to 40 milliseconds. For real time steering, the relative motion of the robot end effector tip to the real path has to be updated at a frequency which will allow the robot to move along the real path without significant errors. There are many advantages to combining sensor-based control with taught path programming. The latter provides a convenient means of coordinating robot motions with those of peripheral devices, such as positioners, welders, spray painters, conveyors, etc. Robots programmed in this manner are readily connected to interlock systems essential to the safety of human operators and neighboring equipment. Second, use of taught path information as a reference control command guides the end effector close to the proper path. In so doing the amplitude of control corrections will be reduced, as will the operating range required of sensors. Third, the taught path information provides a valuable backup data base, to be used in case of a sensor or signal processing malfunction. The robot controller can rely on taught path data until valid sensor measurements are required.

Another tracking scheme is that sensor data may be used as the only information guiding the robot along the path, without reference to a taught path. An example of this method is given in U.S. Pat. No. 4,542,279, A. W. Case, Jr. et al, "Microvector Control for Edge and Joint Following".

SUMMARY OF THE INVENTION

An object of this invention is to provide a real time steering capability which will permit the robot motion to be modified continuously in two or three dimensions as the robot is moving along a taught path.

Another object is the provision of a control algorithm concept and robot interface which will allow real time path steering of a welding torch or other end effector in response to a feedback sensor, coordinated with the robot taught path at the preprogrammed path velocity.

Yet another object is to provide a consistent, unified concept for integrating real time sensor information with the taught path program.

An illustrative method of generating real time steering commands to be presented to the controller of a taught path robot, which tracks along a desired path in coordination with the taught path and at the preprogrammed velocity using information from a look ahead path sensor, is as follows. The sensor images are analyzed to extract critical point path location data for the desired path in front of and along the direction of travel of the robot end effector. This path location data is stored and, after a delay, critical points on the desired path just ahead of the current position of the end effector are retrieved. The real time steering algorithms are divided into two control functions: end effector steering control and end effector rotation control. The following are calculated in the tracking control and x, y, z and twist rates are sent to the robot controller at preselected intervals such as every control cycle or two. The offsets are determined as separate x, y, z and twist integrations for the end effector and represent the total deviations from the robot taught path. The total motion command is the taught path plus these offsets.

A target path vector is computed from the present end effector position to a critical point on the desired path. A taught path vector is determined from information on a pair of taught points input from the robot controller. A robot programmed velocity modifier is calculated and is equal to the cosine of the angle between the target path and taught path vectors. When the actual path deviates from the taught path, this modifier, sent to the robot controller, slows down the robot taught velocity and maintains coordination with the robot taught points. A correction velocity is computed which is perpendicular to the taught path, in order to follow the desired path at the programmed velocity. A twist correction is calculated using undelayed path location data and is an angular velocity correction to keep the desired path approximately centered in the field of view of the vision sensor. The x, y, z and twist correction velocities are sent to offset integrators to generate, in real time, the offsets to the taught robot path that are presented to the robot controller.

Controlling an arc welding robot to track a three dimensional path in real time is the preferred embodiment. The look ahead path sensor is a two dimensional television-type camera which observes a laser stripe on the workpiece, and the end effector is a welding torch steered to follow various joint geometries. The electrode tip is on the wrist rotation axis such that the tip position is not changed with wrist rotation.

Another aspect of the invention concerns an improvement to a taught path robot and provision of means to modify the taught motion to track along a three dimensional path in coordination with the taught path and at the programmed taught path velocity. The improvement is comprised of the look ahead path sensor, and a signal processor to analyze the images and generate path location data for known distances in front of the end effector. A tracking control has means to compute the robot programmed velocity modifier based on the difference between the taught path and target path, correction velocities perpendicular to the taught path, and at least one angular velocity to keep the actual path within the sensor field of view. Offset integrators are provided to integrate the correction and angular velocities and transmit position offsets to the robot controller.

BRIEF DESCRIPTION OF THE DRAWINGS

FIG. 6 is a real time tracking and robot control block diagram.

FIG. 8 illustrates a butt joint and the twist angle correction measured from the camera origin.

FIG. 10 is a position diagram in robot world coordinates illustrating the target path and taught path vectors.

FIG. 11 shows the twist angle control.

DETAILED DESCRIPTION OF THE INVENTION

Figure 1:
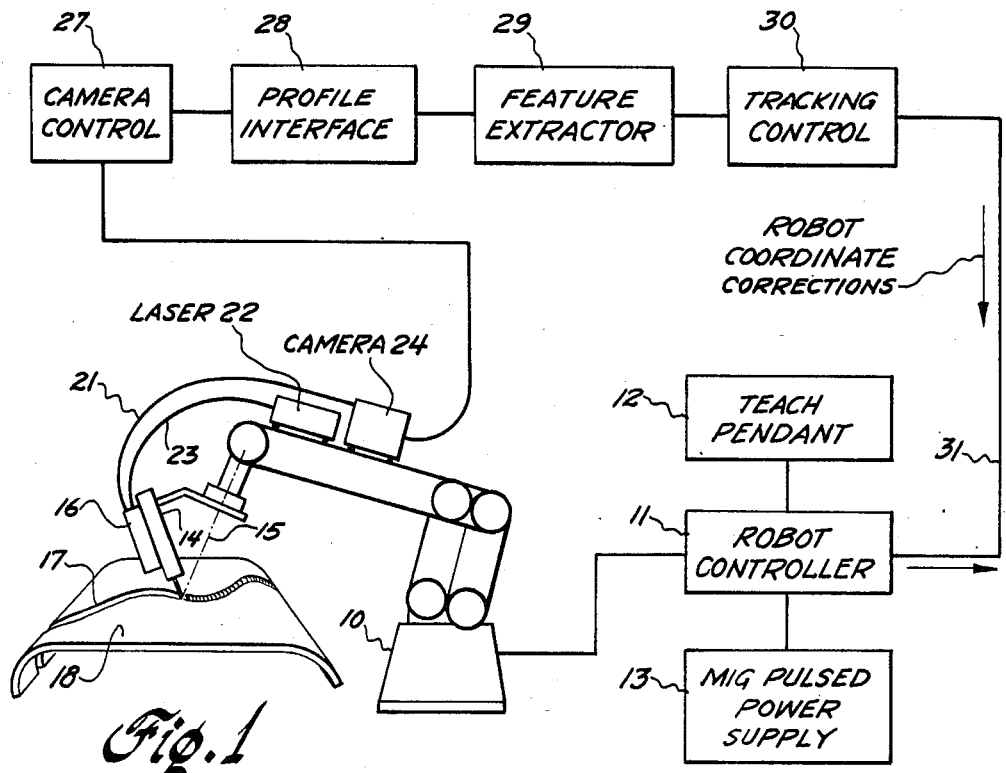
FIG. 1 is a block diagram of a metal-inert-gas (MIG) welding vision system which has a 3-dimensional real time tracking control.
Figure 2:
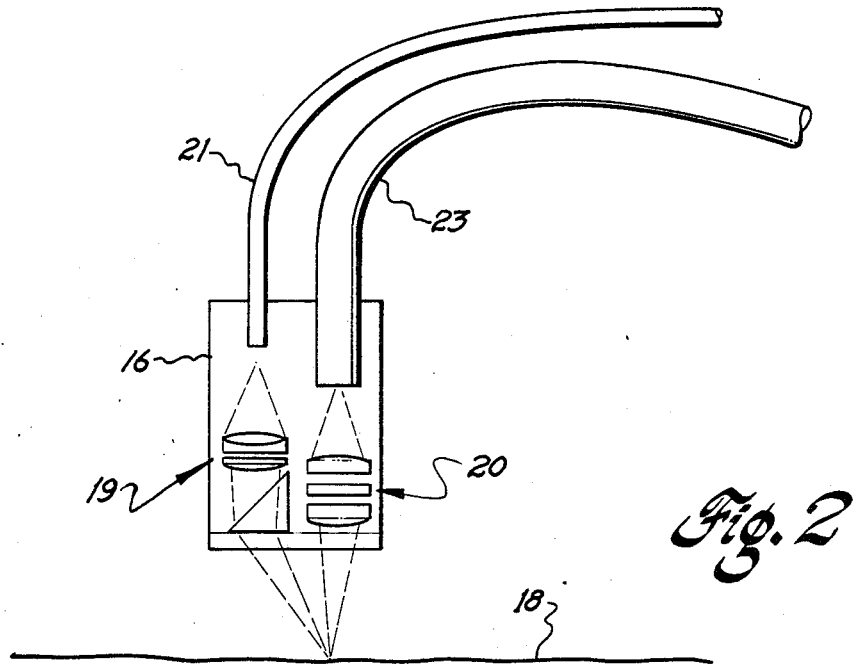
FIG. 2 illustrates the robot sensor head and profiler optics.

The MIG (Metal-Inert-Gas) welding vision system shown in FIG. 1 uses a General Electric P50 robot 10 and the robot controller 11 and teach pendant 12 provided with the robot, and a commercially available MIG pulsed power supply 13. However, the invention can be applied to any robot which has the capability of interfacing with a real-time tracking control computer. A welding torch 14 is mounted on the wrist of the robot, angled at 45° to the wrist rotation axis 15. The tip of the electrode is placed on this twist rotation axis such that the tip position is not changed with wrist rotation. The profiler optics unit 16, part of a look ahead path sensor, is mounted to the welding torch in a manner which allows the wrist rotation to position the sensor over the path 17 to be followed, the joint between workpieces 18. Referring also to FIG. 2, the sensor head 16 contains the projection optics 19 and imaging optics 20; the first collimates and focuses a laser beam from fiber optic 21 and laser source 22 and projects a structured light pattern such as a laser stripe onto the weld joint ahead of the weld puddle, and the second images the light stripe, weld joint and surrounding workpiece area onto the entrance of a coherent fiber optic cable 23 which transmits the image of the scene to a two-dimensional television-type camera 24. The laser stripe is projected on the surface at an angle to the viewing direction which produces azimuth left-right steering signals as well as relative height data.

Figure 3:
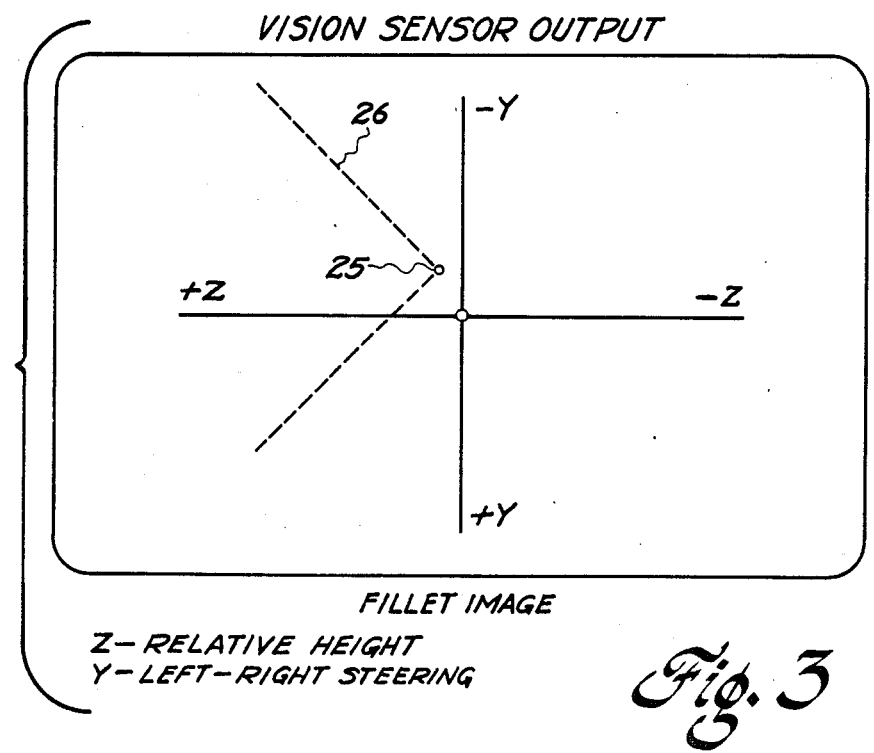
FIG. 3 shows one vision sensor output, the image for a fillet joint.

A typical vision sensor output, a fillet joint image, is shown in FIG. 3. The optical path has filters to pass the laser frequency and discriminate against arc and other lighting. A critical path location point 25 is located at the intersection of the two segments of the light stripe image 26. The Z dimension yields relative height and Y gives left-right steering information. The video signal read out of camera 24 (FIG. 1) is fed to the camera control 27 and hence to a signal processor comprised of a profile interface 28, a high speed data acquisition system. A feature extractor 29 does signal processing to determine the critical path location points of various joint geometries such as fillet, lap, and butt. The tracking control 30 is described in detail later and computes robot coordinate corrections which are sent to robot controller 11. Information on the taught path is supplied to the tracking control over two-way SDLC (Synchronous Data Link Control) link 31.

Figure 4:
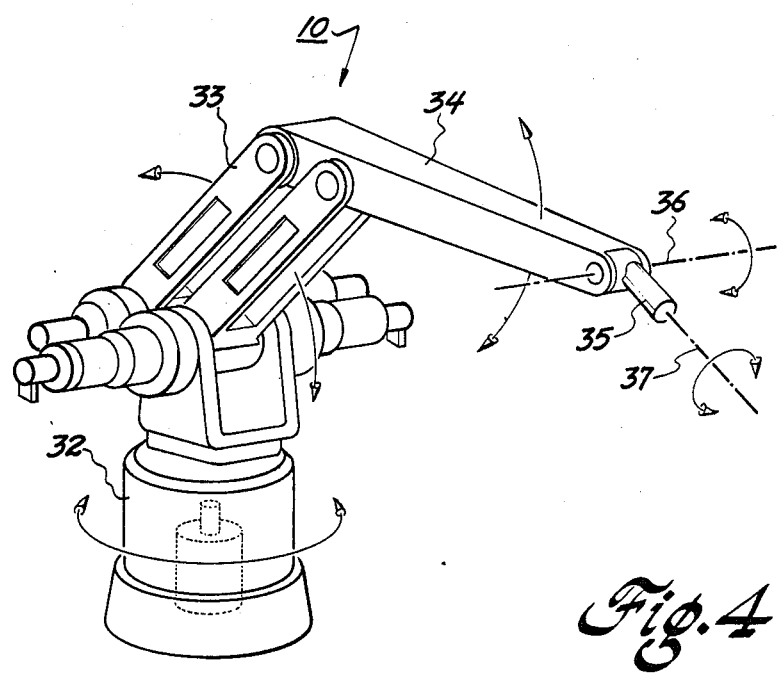
FIG. 4 is an enlarged perspective view of the 5-axis robot illustrated in FIG. 1.

The P50 robot is a five degree of freedom industrial manipulator having a mechanical structure resembling that of a parallelogram. The five axes and direction of motion are seen in FIG. 4. The base structure 32 rotates right and left, the upper arm 33 pivots backward and forward, the forearm 34 has up and down motion, and the wrist 35 has bend and twist rotations, the former up and down about axis 36 and the latter left and right about twist axis 37. Teaching is accomplished by articulating the robot arm through the required motion with the teach pendant. The pendant also allows setting of motion conditions including speed, acceleration/deceleration functions, rough/fine positioning tolerances, and external input/output switches. The controller for the P50 is a position and speed controller, commanding the robot to move between the programmed positions at a preset speed. The motion control is accomplished inside the controller by a path planning algorithm which divides the programmed path into a number of points in cartesian space. Each of these cartesian points is transformed into joint coordinates of the robot. The joint coordinates are sent to a position control loop which performs closed loop control on the joint angles, as measured from encoders located at the servo motors. Other information on this robot is given in publically available operator's manuals and in the open literature.

Figure 5:
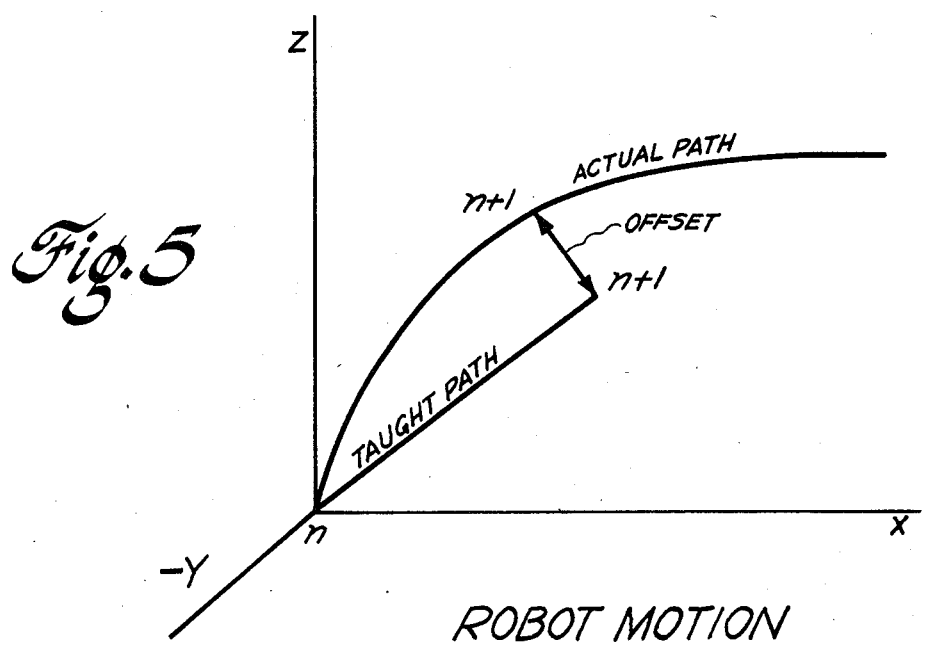
FIG. 5 is a vector diagram of robot motion to follow a path other than the taught path.

The pre-taught program is not adequate for certain applications that were discussed. In those applications, it becomes necessary to provide a means of deviating from the pre-taught path based on inputs from a real-time path sensor. The deviation from the taught path has to be accomplished in coordination with the taught motion of the robot. The motion of the conventional robot is accomplished as a series of incremental absolute position moves along a taught path at time intervals of 10 to 40 milliseconds. For real time steering, the relative motion of the robot end effector tip to the real path has to be updated at a frequency which will allow the robot to move along the real path without significant errors. In order to follow a path other than the taught path, the total robot motion command consists of the taught path plus an offset (FIG. 5). This invention provides algorithms which compute the offsets to the robot taught path in a manner that allows the robot to smoothly follow the actual path, as measured by a feedback sensor. The magnitude of the offset is computed and added to the robot taught motion such that the velocity along the actual path is the taught pre-programmed velocity. The offsets are stored as separate x, y, z, twist and bend integrations for the end effector and represent the total deviations from the robot taught path.

The robot controller modifications to implement two and three dimensional real time tracking are as follows. The conventional 5-axis robot computation is modified to provide a means of changing the taught path. The added computation consists of offset integrators in software for each of the robot control variables, the end effector x, y, z position and other control angles. The outputs of the integrators are added to the interpolated robot taught path prior to the coordinate conversion that is required to command each of the articulated robot axes. Refer to FIG. 6 which shows the real time tracking control and robot control and their interaction. The standard robot controller performs a robot interpolation routine at 38 using pairs of taught points from memory 39. The interpolated positions are fed to a summing junction 40, the outputs of which undergo coordinate conversion at 41. The servo commands are angle position data. The control steering algorithms, which reside in a separate tracking control computer, require that the real time positions of the robot end effector and arms and the taught points currently used by the robot be provided as inputs. The input and output variables between the robot and the real time steering computer are communicated via a serial I/O or parallel link. The frequency of the data transfer is dictated by the path velocity and part geometry. The real time steering algorithms are divided into two control functions, the end effector steering control and the end effector rotation control indicated at 42 and 43. Both are fed information from the look ahead path sensor 44.

The end effector steering control 42 generates the cartesian coordinate velocity commands dx_pos, dy_pos, and dz_pos, and the end effector rotation control 43 the bend and twist velocity commands db_pos and dc_pos. The bend angel is not changed in this implementation and is included for generality, bend is used to keep the torch axis normal to the surface. These are the velocity command inputs or steering commands for real time steering, and are sent to the offset integrators 45.

The offset integrations in equation (1) are calculated with discrete time increment (i) computations and are updated at the same interval, or a multiple of that interval, as the robot taught path motion command. The offset integrators 45 are contained in the robot control to insure coordination with the taught path motion. They are not a standard part of the robot controller; it is equally correct to show them at the left of the dashed line, in the tracking control itself.

$$Xi+1=Xi+dx\_pos$$
$$Yi+1=Yi+dy\_pos$$
$$Zi+1=Zi+dz\_pos \qquad (1)$$
$$Bi+1=Bi+db\_pos \text{ Bend angle}$$
$$Ci+1=Ci+dc\_pos \text{ Twist angle}$$

The quantities dx_pos, dy_pos, dz_pos, db_pos, and dc_pos, when used to compute (Xi+1, Yi+1, etc) at 0.040 or 0.080 seconds time intervals, represent velocity command inputs to the robot for real time steering. The X,Y, Z, B and C position offsets (see FIG. 5) are generated by offset integrators 45 and are summed at 40 with the taught path position information. The robot interpolation calculation yields x, y, z, bend and twist commands to the robot along the taught path; to these are added the respective outputs of offset integrators 45. The integrators keep track of the distance along a line L between two taught points (this robot works linearly and moves incrementally with linear steps). The integrator output S continuously increases as the robot moves toward a taught point. The robot compares S with L and extracts a new pair of taught points when S=L. In addition to computing the velocity commands, the robot software is modified to allow the taught path velocity of the robot to be modified by the quantity VMOD. VMOD is a multiplication factor which permits the robot taught path velocity to be increased or decreased as determined by the real-time control steering algorithms. It is calculated by the steering control 42 and used in the robot interpolation routine shown at 38.

Figure 7:
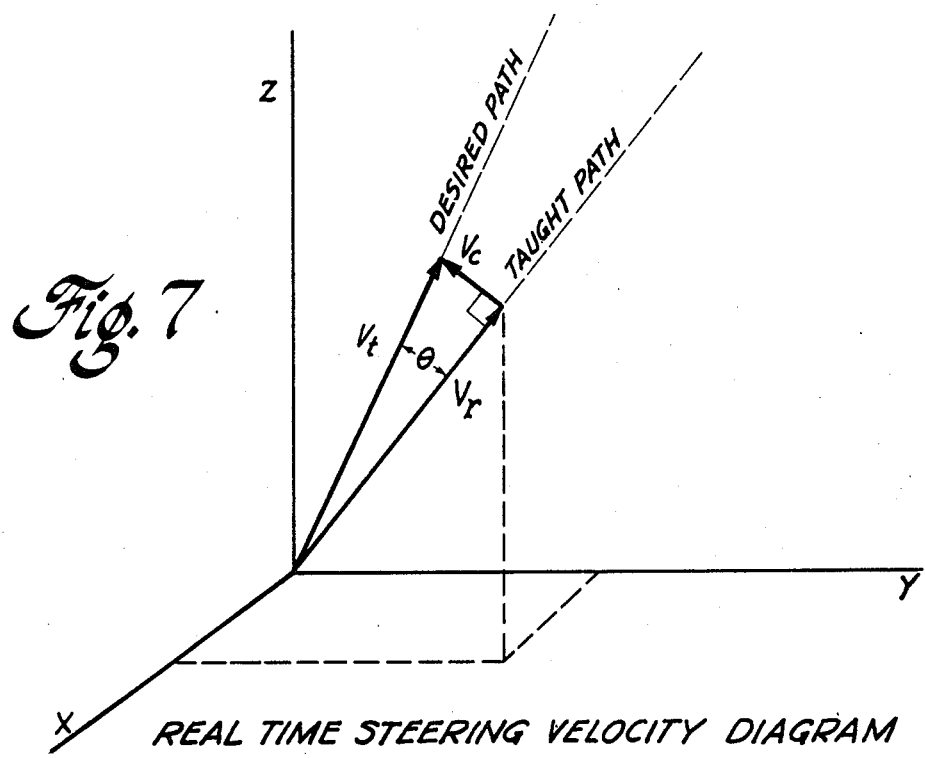
FIG. 7 is a real time steering velocity vector diagram.

The end effector steering control is explained with reference to FIG. 7. The real-time path steering concept is based on using the look ahead capability of the path sensor. If the steering commands dx_pos, dy_pos, dz_pos, etc., are zero the robot moves along parallel to the taught path direction. The path sensor looks ahead to provide path position input for the actual path relative to the robot end effector. The predicted or desired path position, the present position of the robot end effector, and the robot taught path direction are used to calculate the desired direction of travel at predetermined intervals such as one or two interpolation cycle times. The real-time path steering algorithm computes a 3-dimensional correction velocity vector, Vc, which is perpendicularly added to the robot taught path velocity vector, Vr. The look ahead path sensor, the vision sensor, determines the desired direction of travel at an incremental distance ahead of the end effector tip. The tip is steered incrementally with linear path steps along the desired path direction. The sample data rate and the look ahead distance for the real time steering commands are selected to guarantee that the linear incremental path is a good approximation to a curved path. The steering correction velocity vector Vc is determined by the velocity commands to the robot dx_pos, dy_pos, dz_pos. In the vector diagram Vt, the tracking velocity along the desired path, is equal to the welding velocity, Vw, which in turn is the same as the programmed velocity. The magnitude of the steering, correction velocity Vc is calculated equal to Vw sin θ. Theta is the angle between the robot taught path direction and the measured position of the desired path. The VMOD (robot taught path velocity modifier) command calculation performed in the tracking control algorithm equals cos θ and is multiplied times the robot preprogrammed taught path velocity to get Vr. The robot taught velocity is reduced by cos θ. The vector sum of the correction velocity Vc and the modified robot taught path velocity Vr is equal, in magnitude, to the programmed path velocity Vw. When the actual path deviates from the taught path, the VMOD factor slows down the robot taught velocity (this is a calculation done by the robot interpolation software at 38) and maintains coordination with the robot taught path points. The real-time steering algorithms guarantee that when the actual path and taught path coincide, the offset integrators 45 are zero and the taught path is equivalent to the actual path at the point of coincidence.

The end effector rotation control is explained with reference to FIG. 8. The look ahead path sensor is implemented with a vision sensor, a proximity sensor, or any other type of sensor that will provide a path position location ahead of the robot end effector in the direction of travel. The location of the desired path is determined based on the present, current position of the robot end effector and the sensor signal. The sensor, specifically sensor head 16 in FIG. 1, is mounted to the robot end effector in a manner which allows the wrist rotation about axis 15 to position the sensor over the path to be followed. The end effector tip is placed on the wrist rotation axis 15 such that the tip position is not changed with wrist rotation. A simple butt joint 17 is shown in FIG. 8; the critical points detected by the laser stripe are the two joint edges and the delayed critical point 46' toward which the robot is steered. The twist angle $\alpha$ is the angle between lines joining torch tip 47 and undelayed critical point 46 (in the center of the gap) and camera origin 48. The angular velocity control term dc_pos is used by the real time steering algorithms to rotate the sensor over the desired path and keep the desired path within the sensor field of view. The sensor is rotated through angle $\alpha$ so that the camera origin is over the center of the weld joint being followed.

An overview of the path tracking algorithms is outlined below, referring to FIG. 9. The control algorithms are defined assuming that the look ahead path sensor coordinate axes are tilted at an angle to the fixed robot world coordinate system. Measured path location sensor data and robot coordinates received from the robot are converted to a common set of units. A twist rate or angular velocity correction is computed to center the desired path in the sensor field of view. The location of the path position detected by the sensor algorithm is transformed from vision coordinates to robot, absolute coordinates. The resulting path location data in robot coordinates, i.e. the critical points, is stored in a ring buffer or other delay. The ring buffer is used to account for the time delay between the location on the part as seen by the sensor and when the robot end effector reaches it. A critical point or target point slightly in front of the end effector is retrieved from the ring buffer. In FIG. 1 sensor head 16 is about 2 inches in front of the electrode tip, and the target points read out of the delay are about $\frac{1}{8}''$ to $\frac{1}{4}''$ in front of the electrode. The target path vector from the end effector tip to the selected location on the desired path is computed. The robot is steered to travel along this vector at the preprogrammed path velocity. Corrections to the current robot taught path are computed, based on the difference between the target path vector and the taught path vector.

Figure 9:
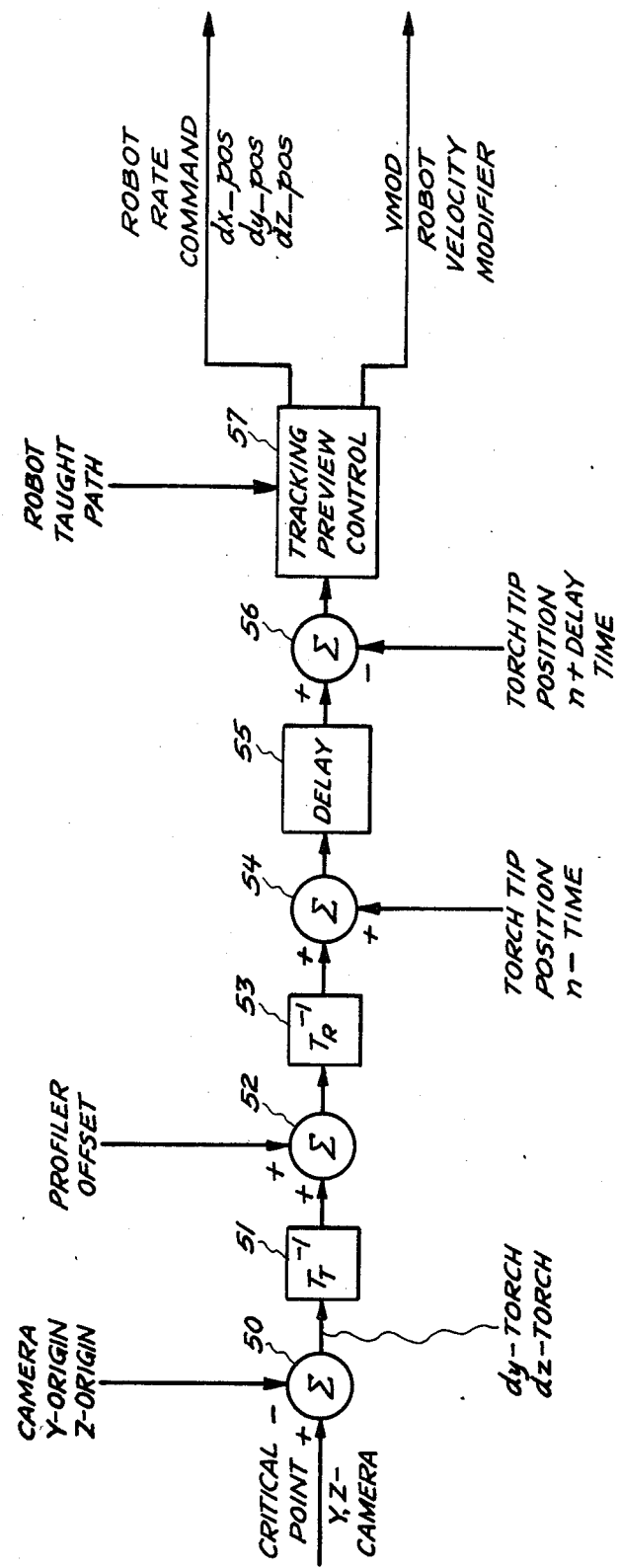
FIG. 9 is a torch tip steering control block diagram.

The torch tip steering control, FIG. 9, begins with acquiring and analyzing the vision sensor images and producing path location data for the desired path in front of the end effector. The critical points (25 and 46' in FIGS. 3 and 8) are determined in y, z camera coordinates and subtracted at 50 from the camera y-origin and z-origin coordinates, yielding dy_torch and dz_torch, the relative position of the path as sensed by the vision sensor. The latter are subjected to a tilt angle coordinate transform at 51 (the tilt angle is 45°) to go from path sensor to vision coordinates. The vision coordinate system has its z-axis parallel to the robot z axis and its x and y axes in a horizontal plane. The profiler offset (about 2 inches here) is added at 52 to the transformed quantities and goes through a robot angle coordinate transform at 53. The vision coordinate system changes as the torch rotates, so the data is transformed to a fixed coordinate system that is always valid, the robot x, y, z axes. The end effector or torch tip position at n time is summed at 54 with the critical point path location data in robot coordinates and passed to delay circuit 55; the calculation in equation (8) is performed at 54. The critical point or target point extracted after a given delay is just ahead of the present position of the torch tip and is subtracted at 56 from the torch tip position at n+delay time. The result is the target path direction vector that the end effector tip is to follow. The tracking preview control 57 is presented with robot taught path information from the robot controller, the coordinates of the current end effector position, and the critical points derived from the vision data. The robot rate commands, the correction velocities dx_pos, dy_pos, and dz_pos, are computed, and VMOD, the robot velocity modifier. The path corrections are transmitted to the robot at the beginning of each tracking control, interpolation cycle or after two such interpolation cycles.

The following are computed repetetively in the tracking control 57 (see FIG. 10): a target path vector from the present end effector position to the designated critical point on the path to be followed; a taught path vector from the pair of taught points obtained from the robot; and the programmed velocity modifier VMOD which is equal to the cosine of the angle between the target path vector and taught path vector. The correction velocities perpendicular to the taught path in order to follow the desired path at the programmed taught path velocity are calculated. This is done by multiplying the programmed velocity by the difference between the normalized target path vector and the normalized taught path vector multiplied by the velocity modifier VMOD (cos $\theta$).

The end effector rotation or twist control is shown in FIG. 11, and keeps the sensor image approximatley centered in the field of view of the sensor. The critical path location point, y-camera, is subtracted at 58 from the y-origin coordinate, the error is transformed through the torch tilt angle to vision system coordinates at 59, and dy_vis, the sensor output rotated through the tilt angle, is fed to the lead-lag compensator 60. Dynamic compensation is provided, for stabilization, between the twist angle error and feedback control dc_pos, the angular velocity command transmitted back to the robot control.

The algorithms to realize 3 dimensional real time tracking control of the robotic welder in FIG. 1 are now given.

Conversion of Sensor and Robot Data

In the following (see Nomenclature listing), x_robot, y_robot, and z_robot define the current position of the robot end effector in the robot coordinate system. dy_torch and dz_torch represent the relative position of the path as sensed by the look ahead path sensor. c_twist is the rotation angle of the robot end effector. y_midpt and z_midpt represent coordinates of the actual path position relative to the origin of the path sensor coordinate system.

$$x\_robot = x\_coef\_mm\_bit * x\_pos$$

$$y\_robot = y\_coef\_mm\_pk\ bit * y\_pos$$

$$z\_robot = z\_coef\_mm\_bit * z\_pos \quad (2)$$

$$c\_twist = twist * coef\_bit\_rad$$

$$dy\_torch = -y\_midpt * y\_coef\_mm\_pix \quad (3)$$

$$dz\_torch = z\_midpt * z\_coef\_mm\_pix$$

Transform from Path Sensor to Vision Coordinates

The vision coordinate system is defined to have its z-axis parallel to the robot z axis, with its x and y axes in a horizontal plane. The path sensor coordinate system is tilted relative to the vision coordinate axes system. A coordinate transform is required to go from path sensor to vision coordinates.

$$dy\_vis = dy\_torch * cs\_tilt + dz\_torch * sn\_tilt$$

$$dz\_vis = -dy\_torch * sn\_tilt + dz\_torch * cs\_tilt \quad (4)$$

Twist Angle Control (FIG. 11)

Twist angle control is used to keep the center of the sensor image centered in the sensor field of view. The twist control moves the sensor in this example in the horizontal plane only and acts to keep dy_vis as close to zero as possible. The twist angle error is defined as:

$$c1\_er = -dy\_vis \quad (5)$$

The twist angle control provides dynamic compensation between twist angle error and feedback control dc_pos. Note that dc_pos is a velocity command transmitted back to the robot control.

$$c2\_n1 = c1\_er + k2\_twist * c2\_n$$

$$dc\_pos = g\_twist * c2\_n \quad (6)$$

Store Path Location in Ring Buffer

The path sensor data cannot be used directly for end effector guidance. Since the look ahead path sensor is approximately 50 mm in front of the end effector, steering the end effector immediately towards the located point would result in an excessive rounding of corners. To overcome this problem, data is stored in a ring buffer. Data moves through the buffer at the same speed as the end effector, with the buffer designed to have the same length as exists between end effector and path sensor. Since it is inefficient to constantly move data in the ring buffer, pointers are moved to the appropriate points in the buffer during each control cycle. The variable ring_pt indicates the location in the buffer where new data is to be stored (i.e. data just received from the path sensor). Since the vision coordinate system is constantly changing as the torch rotates, data is transformed to a fixed coordinate system that will always be valid. The fixed coordinate system selected is the robot x, y, z axes. The coordinate transform consists of a rotation (by angle c_robot) and a translation (by x_robot, y_robot, z_robot). Angle c_robot is the sum of the current twist angle and the angle of the robot arm projected onto the x-y plane:

$$c\_arm = \arctan2(y\_robot, x\_robot) \quad (7)$$

$$c\_robot = c\_arm + c\_twist$$

$$cs\_c\_robot = costp(c\_robot)$$

$$sn\_c\_robot = sintp(c\_robot)$$

$$x\_jnt[ring\_pt] = d\_prof * cs\_c\_robot - dy\_vis * sn\_c\_robot + x\_robot$$

$$y\_jnt[ring\_pt] = d\_prof * sn\_c\_robot + dy\_vis * cs\_c\_robot + y\_robot \quad (8)$$

$$z\_jnt[ring\_pt] = dz\_vis + z\_robot$$

The first step taken is to compute the length of the buffer and the preview distance. To make sure that the ring buffer is initialized only once per run a start flag is used. This flag is set by the robot when track_req is set along the taught path. The length of the ring buffer is indicated by an integer k_delay, which is proportional to the distance between effector tip and the path sensor, and inversely proportional to programmed velocity. Note that as different program path velocities are selected by the user, the ring buffer will be changed automatically. However, for any run between track_req on and track_req off, programmed velocity must be constant. The second length computed is the preview length k_preview. This length is used to select the tracking target point a short distance in front of the end effector tip. The ratio between k_preview and k_delay is set by a floating point variable k_interval. A value of 0.30 for k_preview sets a target point which is 30% of the distance between the path sensor and the robot end effector tip.

$$k\_delay = d\_prof / velocity \quad (9)$$

$$k\_preview = k\_delay * k\_interval$$

Ring Buffer Update

Moving through the ring buffer during each control cycle is implemented by incrementing the pointer. The ring effect is achieved by resetting ring_pt to zero when it reaches the buffer length k_delay.

$$ring\_pt++; \quad (10)$$

if (ring_pt >= k_delay) ring_pt = 0

Similarly, a pointer kk is used for selecting the critical point or target point from the ring buffer, at a distance k_preview in front of the torch:

$$kk = ring\_pt + k\_preview$$

if (kk >= k_delay) kk = kk - k_delay \quad (11)

Vector to Target Point

The vector to the critical point is calculated by taking the vector difference between the current effector tip position and the point retrieved from the ring buffer:

$$x\_jnt\_kk = x\_jnt[kk]$$

$$y\_jnt\_kk = y\_jnt[kk] \quad (12)$$

$$z\_jnt\_kk = z\_jnt[kk]$$

$$dx\_vis\_p = x\_jnt\_kk - x\_robot$$

$$dy\_vis\_p = Y\_jnt\_kk - y\_robot$$

$$dz\_vis\_p = z\_jnt\_kk - z\_robot \quad (13)$$

$$mag\_vis\_p\_2 = dx\_vis\_p * dx\_vis\_p + dy\_vis\_p * dy\_vis\_p + dz\_vis\_p * dz\_vis\_p$$

$$\text{mag\_vis\_p} = \text{sqrt}(\text{mag\_vis\_p\_2}) \tag{14}$$

Taught Path Vector

Using a similar calculation, the taught path vector and magnitude are calculated:

$$x\_21 = x2\_pos - x1\_pos$$
$$y\_21 = y2\_pos - y1\_pos \tag{15}$$
$$z\_21 = z2\_pos - z1\_pos$$

$$\text{mag\_21\_2} = x\_21 * x\_21 + y\_21 * y\_21 + z\_21 * z\_21$$

$$\text{mag\_21} = \text{sqrt}(\text{mag\_21\_2}) \tag{16}$$

Velocity Correction Along Taught Path

The tracking control variables are calculated in two steps: first, the velocity along the taught path is corrected, second the vector correction perpendicular to the taught path is computed. The tracking algorithm is designed to meet the following criteria: correct robot tip motion to be directed toward the selected point along the path measured by the look ahead path sensor and maintain a constant path speed. The first criterion is satisfied by aligning the tracking control vector with the vector previously derived going from current effector tip position to critical point. The second criterion is satisfied by setting the vector magnitude of the tracking control vector to be equal to the programmed path velocity. If the critical point is located on the taught path (i.e., no tracking error), then the robot should continue along the taught path at the nominal programmed path speed. If the target point is located off the taught path, a correction perpendicular to the path is required. Since the vector sum of the tracking controls must be equal to the programmed path speed, it is necessary to reduce the component of the torch velocity along the taught path. The strategy is to multiply the velocity component along the taught path by a factor equal to the cosine of the angle between the taught path vector and the target path vector. The cosine is calculated efficiently from the vector dot product:

$$\text{vis\_projection} = (x\_21 * dx\_vis\_p + y\_21 * dy\_vis\_p + z\_21 * dz\_vis\_p)/(\text{mag\_vis\_p}*\text{mag\_21}) \tag{17}$$

For zero path error, vis_projection or VMOD equals 1. For a non-zero path error, vis_projection is a value less than 1, which means that the robot will slow down along the taught path. The actual end of path will be located as follows: If the final taught point is coincident with the true end of the path on the workpiece, the location of the end of the tracked path will be at that point (i.e. perfect end of path). If the final taught point does not lie on the true path, the location of the end of the tracked path will be on a plane perpendicular to the taught path passing through the last taught point. Since most applications for the tracking system will be used to correct for path location errors lateral to the taught path, this type of end-of-path location will be nearly exact. This approach implies the constraint that the angle computed in Eq. (17) be within +/−90 deg, to prevent the robot from backing up relative to the taught path. This constraint will be satisfied as long as the taught path is reasonably close to the true path (i.e., pointed in the same quadrant).

Velocity Corrections Perpendicular to Taught Path

The final step in the tracking control computation is to determine the velocity corrections perpendicular to the taught path. To satisfy the constraint that the tracking velocity equal the programmed path speed, the components of the target path vector are normalized by its magnitude $$1/\text{mag\_vis\_p} \tag{18}$$

The quantity mag_vis_p results from Eq. (14). Since the robot is already moving along the taught path at the corrected interpolation velocity, it is necessary to subtract the normalized modified taught path vector from the normalized target path vector (see FIG. 10), to get the desired path velocity correction vector:

$$dx\_pos = Vw * (dx\_vis\_p/\text{mag\_vis\_p} - x\_21 * \text{vis\_projection}/\text{mag\_21})$$

$$dy\_pos = Vw * (dy\_vis\_p/\text{mag\_vis\_p} - y\_21 * \text{vis\_projection}/\text{mag\_21})$$

$$dz\_pos = Vw * (dz\_vis\_p/\text{mag\_vis\_p} - z\_21 * \text{vis\_projection}/\text{mag\_21}) \tag{19}$$

NOMENCLATURE

X—robot world coordinate (mm)
Y—robot world coordinate (mm)
Z—robot world coordinate (mm)
B—robot wrist bend angle (radians)
C—robot wrist twist angle (radians)
VMOD—robot programmed velocity modifier
dx_pos—X tracking control velocity command (bits/sec)
dy_pos—Y tracking control velocity command (bits/sec)
dz_pos—Z tracking control velocity command (bits/sec)
db_pos—bend tracking control rate command bits/sec)
dc_pos—twist tracking control rate command bits/sec)
Vw—programmed path velocity mm/sec
Vc—tracking control steering velocity vector mm/sec
Vr—modified taught path velocity vector mm/sec
Vt—programmed path velocity along actual path mm/sec
x-pos—present robot end effector position (bits)
y_pos—present robot end effector position (bits)
z_pos—present robot end effector position (bits)
x_robot—present robot end effector position mm
y_robot—present robot end effector position mm
z_robot—present robot end effector position mm
y_midpt—path sensor output pixels
z_midpt—path sensor output pixels
x_coef_mm_bit—conversion x coefficient bits/mm
y_coef_mm_bit—conversion coefficient bits/mm
z_coef_mm_bit—conversion coefficient bits/mm
twist—twist angle robot coordinates bits
c_twist—robot twist angle radians
dy_vis—path sensor output rotated through tilt angle (mm)
dz_vis—path sensor output rotated through tilt angle (mm)
cl_er—(−dy_vis)
c_arm—robot arm angle relative to robot coordinates (radians)
c_robot—sum of c_arm and $c_{13}$ twist
x_jnt(ring pt)—sampled path position in robot coordinates (mm)

y_jnt(ring pt)—sampled path position in robot coordinates (mm)
z_jnt(ring pt)—sampled path position in robot coordinates (mm)
k_delay—length of ring buffer (mm)
k_preview—preview distance of steering target point (mm)
ring_pt—pointer index for ring buffer
x_jnt_kk—delayed target point robot coordinates (mm)
y_jnt_kk—delayed target point robot coordinates (mm)
z_jnt_kk—delayed target point robot coordinates (mm)
dx_vis_p—desired path vector coordinates (mm)
dy_vis_p—desired path vector coordinates (mm)
dz_vis_p—desired path vector coordinates (mm)
mag_vis_p_2—square of desired path vector magnitude (mm2)
mag_vis_p—magnitude of desired path vector (mm)
x_21—taught path vector coordinates (mm)
y_21—taught path vector coordinates (mm)
z_21—taught path vector coordinates (mm)
mag_21_2—square of taught path vector magnitude (mm2)
mag_21—taught path vector magnitude (mm)
vis_projection—velocity coorection factor VMOD
dy_touch—relative position of path as sensed by path sensor
dz_touch—relative position of path as sensed by path sensor
cs_tilt—cosine of the tilt angle of the sensor head sn_tilt—sinc of the tilt angle of the sensor head
k2_twist—Twist compensation gain
c2_n_compensated twist angle control command
g_twist—twist gain term
costp(c_robot)—cosine of robot arm angle plus twist angle
sintp(c_robot)—sine of robot arm angle plus twist angle
d_prof—offset—distance of sensor from torch tip
k_interval—floating point interval
ring_pt++—pointer to present point in ring buffer
kk—pointer to select target point from ring buffer
x1_pos—taught path point 1
x2_pos—taught path point 2

The performance of the real time steering algorithms following a butt joint with two straight portions connected by a radius has been documented. The robot taught path consisted of four taught points. In normal operation the rabot will traverse between the taught points in straight lines. It was shown that the x, y trajectory differs considerably from the straight line taught path of the robot. A plot of the end effector height control versus x for a workpiece inclined relative to the robot taught path was made. The relative height steering accuracy was found to be excellent. In order to maintain a constant velocity and coordinate the robot taught path while following the actual path, the robot taught path velocity modifier VMOD changed over a range from 1.0 to 0.55. The 3 dimensional tracking system performed real time steering in coordination with the robot control and tracked with an accuracy of 0.06 inches.

Using the same concept, the tracking control has been implemented using 2 dimensional tracking on a TIG welding system which tracked a moving workpiece on a positioner. The TIG system is a 7 axes robot which moves a 5 axes arm and a 2 axes positioner. The real time steering algorithms were configured to produce steering commands for the torch tip relative to the moving workpiece. Such a welding system is described in "Operational Performance of Vision—Based Arc Welding Robot Control System", R. S. Baheti, K. B. Haefnér, L. M. Sweet, Sensors and Controls for Automated Manufacturing and Robotics, ed. by K. A. Stelson and L. M. Sweet, WAM ASME, Dec. 9-14, 1984, pp. 93-105.

In conclusion, combining sensor-based control with taught path programming results in several advantages, chief among which is that the robot motion is conveniently coordinated with those of peripheral devices and with welding condition changes.

While the invention has been particularly shown and described with reference to preferred embodiments thereof, it will be understood by those skilled in the art that the foregoing and other changes in form and details may be made without departing from the spirit and scope of the invention.

The Invention claimed is:

1. A method of generating real time steering commands presented to the controller of a robot which tracks along a desired path on a workpiece in coordination with a taught path and at the programmed taught path velocity using information from a look ahead path sensor, comprising the steps of:
deriving data from said sensor yielding the location of the desired path at critical points in front of a robot end effector;
acquiring the present end effector position from said robot;
computing a target path vector from said present end effector position to a selected critical point on the desired path;
determining a taught path vector from taught point information obtained from said controller;
computing a robot programmed velocity modifier from the angle between said target path and taught path vectors which is sent to said controller to calculate a modified taught path velocity;
computing correction velocities perpendicular to said modified taught path velocity in order to follow the desired path at the programmed velocity;
determining an angular correction to keep the desired path within the field of view of said sensor; and
repeating the foregoing steps at predefined control cycles and sending said correction velocities and angular correction to offset integrators to generate, in real time, offsets to the taught robot path that are transmitted to said controller.

2. The method of claim 1 further including the step of storing said critical points and retrieving the same after a delay such that the retrieved path location is slightly in front of the present end effector position.

3. The method of claim 2 wherein said vectors and correction velocities are three dimensional and said robot tracks a three dimensional path in real time.

4. The method of claim 3 wherein said path sensor is a two dimensional vision sensor.

5. The method of claim 1 wherein said robot programmed velocity modifier is the cosine of the angle between said target path and taught path vectors.

6. The method of claim 5 wherein the correction velocity magnitude is equal to the programmed velocity times the sine of said angle.

7. The method of claim 1 wherein said angular correction is a twist velocity and the tip of said end effector is on the twist axis so that the tip position does not change.

8. The method of generating real time steering commands presented to the controller of a robot to track along a weld joint path in coordination with a taught path and at the programmed taught path velocity, said robot having a welding torch end effector and a look ahead path vision sensor, comprising the steps of:

analyzing vision sensor images and extracting path location data for the desired path ahead of said end effector;

storing said data and, after a delay, retrieving critical points on said desired path slightly in front of the present position of said end effector;

inputting taught point information and said present end effector position from said robot, and said path location data, into a tracking control and repetitively computing the following:

a target path vector from said present end effector position to a given critical point;

a taught path vector from said taught point information;

a programmed velocity modifier equal to the cosine of the angle between said target path and taught path vectors; and correction velocities perpendicular to said taught path in order to follow the desired path at the programmed velocity; and transmitting said programmed velocity modifier to said robot controller to determine a modified taught path velocity, and said correction velocities to offset integrators to produce, in real time, offsets to the taught path which are transmitted to said controller in order to steer said welding torch to follow the weld joint.

9. The method of claim 8 further including repetitively calculating an angular velocity correction from undelayed path location data to keep said sensor images approximately centered in the sensor field of view, and sending said angular velocity correction to another offset integrator to generate in real time a twist offset which is presented to said controller.

10. The method of claim 9 wherein said sensor is a two dimensional television-type camera.

11. The method of claim 9 wherein said target path and taught path vectors and correction velocities are three dimensional and the latter comprises x, y, and z velocities in robot coordinates.

12. The method of claim 11 wherein said correction velocities are calculated by multiplying the programmed velocity by the difference between a normalized target path vector and a normalized taught path vector multiplied by said programmed velocity modifier.

13. The method of claim 8 further including the step of transforming said path location data to a robot coordinate system before storing.

14. In a robot having a teach pendant and robot controller which moves an end effector in linear steps between taught points to follow a taught path at a programmed velocity, the improvement of means to modify the taught motion of the robot to track along a desired three dimensional path in coordination with the taught path and at the programmed velocity which comprises:

a look ahead path sensor on said robot to provide images of a workpiece;

a signal processor to analyze said images and generate path location data for known distances in front of said end effector;

a tracking control to which is input said path location data, and taught point and present end effector position information from said robot;

said tracking control having means to compute a robot programmed velocity modifier to correct the current robot taught path based on the difference between the taught path and a target path determined from the present end effector position and a selected path location, correction velocities which are perpendicular to the taught path in order to follow the desired path at the programmed velocity, and at least one angular velocity to keep the desired path within the field of view of said sensor; and offset integrators to integrate said correction and angular velocities and generate, in real time, position offsets that are transmitted to said robot controller.

15. The improvement defined in claim 14 wherein said look ahead path sensor is comprised of structured light projection optics and imaging optics, a two dimensional television-type camera, and fiber optic cables to transmit light from a source and images to said camera.

16. The improvement defined in claim 15 wherein said robot has a rotatable wrist on which said sensor optics and end effector are mounted such that the tip of said end effector is on the rotation axis and the tip position does not change.

17. The improvement defined in claim 16 wherein said end effector is an arc welding torch.

18. The improvement defined in claim 14 wherein said signal processor is comprised of means to delay said path location data and retrieve the same so that said selected location toward which said robot is steered is slightly in front of said end effector.

19. The improvement defined in claim 18 wherein said signal processor has means to extract a series of weld joint critical points from said images which are said path location data.

20. The improvement defined in claim 14 wherein said robot controller has an interpolation cycle and said tracking control computes said modifier and correction velocities every one or two interpolation cycles and transmits the same to said robot controller.

* * * * *